(12) United States Patent
Hoshino et al.

(10) Patent No.: US 8,833,184 B2
(45) Date of Patent: Sep. 16, 2014

(54) PRESSURE-SENSITIVE SENSOR

(75) Inventors: Hiroyuki Hoshino, Kyoto (JP);
Yuichiro Takai, Kyoto (JP); Yoshihiro Kai, Nagaokakyo (JP)

(73) Assignee: Nissha Printing Co., Ltd., Kyoto (JP)

( * ) Notice: Subject to any disclaimer, the term of this patent is extended or adjusted under 35 U.S.C. 154(b) by 665 days.

(21) Appl. No.: 13/063,609

(22) PCT Filed: Sep. 2, 2009

(86) PCT No.: PCT/JP2009/065307
§ 371 (c)(1),
(2), (4) Date: May 25, 2011

(87) PCT Pub. No.: WO2010/032614
PCT Pub. Date: Mar. 25, 2010

(65) Prior Publication Data
US 2011/0290038 A1 Dec. 1, 2011

(30) Foreign Application Priority Data

Sep. 19, 2008 (JP) ................................ 2008-241111

(51) Int. Cl.
*G01L 1/04* (2006.01)
*G01L 1/22* (2006.01)
*G06F 3/041* (2006.01)
*G01L 1/20* (2006.01)

(52) U.S. Cl.
CPC . *G01L 1/20* (2013.01); *G06F 3/041* (2013.01); *G01L 1/2287* (2013.01)
USPC .................................................. 73/862.627

(58) Field of Classification Search
USPC ...................... 73/862.627, 862.045, 862.474, 73/862.633; 438/50, 51, 53
See application file for complete search history.

(56) References Cited

U.S. PATENT DOCUMENTS

| 4,066,851 A | * | 1/1978 | White et al. | .................. 200/5 A |
| 4,794,366 A | | 12/1988 | Sakamoto | |
| 2004/0056669 A1 | | 3/2004 | Morimoto | |

FOREIGN PATENT DOCUMENTS

| JP | 62116229 A | 5/1987 |
| JP | 200248658 A | 2/2002 |
| JP | 200437350 A | 2/2004 |
| JP | 2007171301 A | 7/2007 |

\* cited by examiner

Primary Examiner — Lisa Caputo
Assistant Examiner — Roger Hernandez-Prewit
(74) Attorney, Agent, or Firm — The Webb Law Firm

(57) ABSTRACT

The present invention aims at providing a pressure-sensitive sensor capable of layering a pressure-sensitive layer and electrodes with high productivity, facilitating control of contact between the pressure-sensitive layer and the electrodes by loading, achieving good reproducibility of a resistance value generated by loading between the pressure-sensitive ink layer and the electrodes, and measuring pressure with high accuracy. The pressure-sensitive sensor comprises a pair of electrodes 16a and 16b formed on a substrate film 31, and a pressure-sensitive ink layer 30 juxtaposed to the electrodes on the substrate, the pressure-sensitive ink layer being variable in electrical properties in response to an applied pressing force, wherein a portion of the substrate film 31 having the pressure-sensitive ink layer 30 formed thereon is bent inward to allow the pressure-sensitive ink layer 30 to come into contact with the pair of electrodes 16a and 16b.

7 Claims, 3 Drawing Sheets

Fig 1
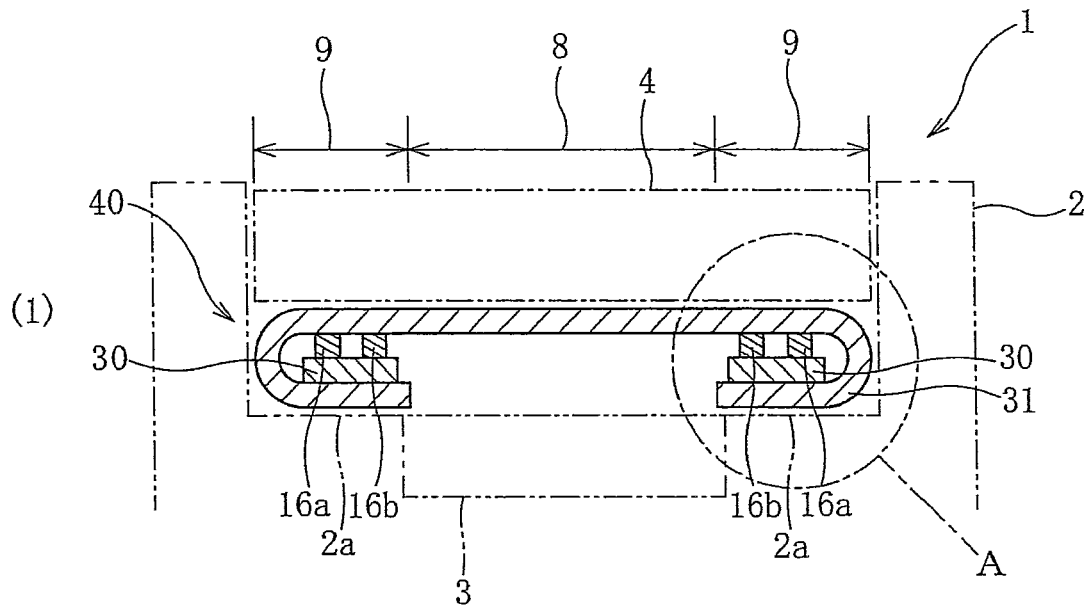
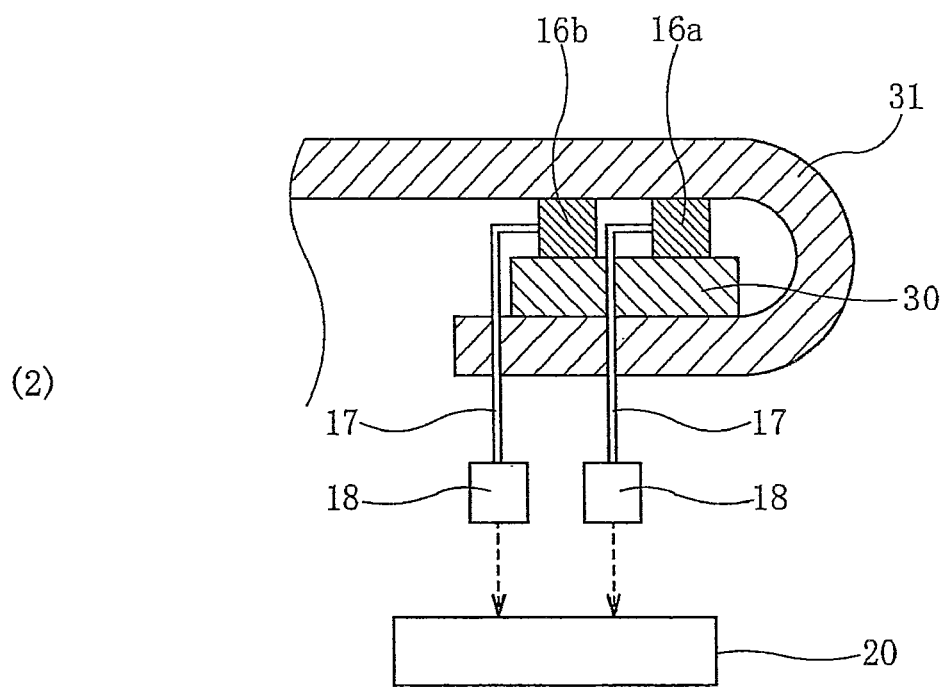

PRESSURE-SENSITIVE SENSOR

TECHNICAL FIELD

The present invention relates to a pressure-sensitive sensor for measuring a pressure distribution of a component of external forces applied to a surface that is vertical to the surface.

BACKGROUND ART

An example of the conventional pressure-sensitive sensors for measuring the pressure distribution of the external force applied to a selected surface is disclosed in Patent Document 1. As shown in FIG. 1 of Patent Document 1, this pressure-sensitive sensor comprises two films layered one above the other, an upper electrode provided in the top layer, a lower electrode provided in the bottom layer, and a pressure-sensitive ink layer disposed between the two layers.

When pressure is applied to the top-side film, only the portion receiving the pressure is made conductive in a vertical direction. Thus, an output is given only on part of the lower electrode corresponding to the portion receiving the pressure, thereby detecting the pressure distribution. This pressure-sensitive sensor may be provided inside of a vehicle seat, for example, to determine whether or not a person is present on the seat and also determine a physical build of the person based on the pressure distribution.

In other words, the pressure-sensitive sensor according to Patent Document 1 is configured to bring both the electrodes into contact with each other through the pressure-sensitive ink layer when pressure is applied, and to measure the pressure based on variations in resistance value in response to the pressure applied to the pressure-sensitive ink layer.

The applicant of the present invention also filed an application for a pressure-sensitive sensor comprising a pair of electrodes mounted on a bottom-side film in which the pair of electrodes are coated with pressure-sensitive conductive layer ink formed on a top-side film. This pressure-sensitive sensor dispenses with a spacer for an air layer because the pair of electrodes are mounted on the bottom-side film and normally coated with the pressure-sensitive conductive layer ink formed on the top-side film. Therefore, this sensor may assume any desired shape depending on how the electrodes are mounted. Further, the pair of electrodes are arranged frame-wise to provide a transparent central portion in the pressure-sensitive sensor, which allows a touch panel to be arranged in the transparent portion.

RELATED ART DOCUMENT

Patent Document 1: Japanese Unexamined Patent Application Publication No. 2002-48658

SUMMARY OF THE INVENTION

Problem to be Solved by the Invention

With the pressure-sensitive sensor constructed as above, however, it is necessary to allow at least either one of the top-side film and the bottom-side film to be outlined or have a frame-like shape in order to achieve good transparency (light beam penetration) in the central portion of the sensor. On the other hand, the outlined, frame-like film is easily crinkled, which makes it difficult to align the two films. This disadvantageously results in complicated layering operations and lowered productivity.

Further, when the outlined, frame-like film is used over a long period of time and aged, the film disadvantageously sags down, for example, which makes it difficult to control the contact between the pressure-sensitive ink layer and the electrodes by loading. Therefore, the reproducibility of the resistance value generated by loading between the pressure-sensitive ink layer and the electrodes is low, as a result of which it has been difficult to measure the pressure with high accuracy.

The present invention has been made having regard to the above-noted problems, and its object is to provide a pressure-sensitive sensor capable of eliminating the problem of sagging of a film, layering a pressure-sensitive layer and electrodes with high productivity, facilitating control of contact between the pressure-sensitive layer and the electrodes by loading, achieving good reproducibility of a resistance value generated by loading between the pressure-sensitive ink layer and the electrodes, and measuring pressure with high accuracy.

Means for Solving the Problem

The present invention provides a pressure-sensitive sensor having the following structure in order to solve the above technical problems.

A first characteristic feature of the present invention lies in a pressure-sensitive sensor comprising a pair of electrodes formed on a substrate, and a pressure-sensitive ink layer juxtaposed to the electrodes on the substrate, the pressure-sensitive ink layer being variable in electrical properties in response to an applied pressing force, wherein a portion of the substrate having the pressure-sensitive ink layer formed thereon is bent inward to allow the pressure-sensitive ink layer to come into contact with the pair of electrodes.

A second characteristic feature of the present invention lies in that the portion of the substrate having the pressure-sensitive ink layer funned thereon is configured to project from a portion of the substrate having the pair of electrodes formed thereon, and has a root portion bent inward.

A third characteristic feature of the present invention lies in that the root portion has a half-cutout or bores in the form of broken line for facilitating inward bending of the root portion.

A fourth characteristic feature of the present invention lies in that the root portion is provided with cutouts at opposite ends thereof for preventing the portion of the substrate having the pressure-sensitive ink layer formed thereon from protruding outward when being bent inward.

Effect of the Invention

According to the first characteristic feature of the present invention, only a single substrate film is used to form the electrodes and the pressure-sensitive layers without using the outlined, frame-like film as describe above at all. Thus, the pressure-sensitive sensor of the present invention achieves the effects that the problem of sagging of the film is eliminated, the contact between the pressure-sensitive ink layer and the electrodes is easily controlled by loading, good reproducibility of the resistance value generated by loading between the pressure-sensitive ink layer and the electrodes can be obtained, and pressure can be measured with high accuracy.

According to the second characteristic feature of the present invention, since the film is always bent in the same manner, the positional relationship between the pressure-sensitive ink layer and the electrodes is inevitably fixed, which facilitates alignment therebetween. As a result, the pressure-sensitive sensor of the present invention achieves the effect that the pressure-sensitive ink layer and the electrodes are layered with high productivity.

According to the third characteristic feature of the present invention, since the film is easily bent, the pressure-sensitive ink layer and the electrodes are aligned more accurately. As a result, the pressure-sensitive sensor of the present invention achieves the effect that the pressure-sensitive ink layer and the electrodes are layered with high productivity.

According to the fourth characteristic feature of the present invention, since the crease is positioned inward, the pressure-sensitive sensor of the present invention achieves the effect that the appearance of the product is not adversely affected even if a bulge appears when the film is bent.

BRIEF DESCRIPTION OF THE DRAWINGS

FIG. 1(1) is a sectional view schematically showing an embodiment of a pressure-sensitive sensor according to the present invention, and FIG. 1(2) is an enlarged view of a portion A indicated in FIG. 1(1);

MODE FOR CARRYING OUT THE INVENTION

Figure 2:
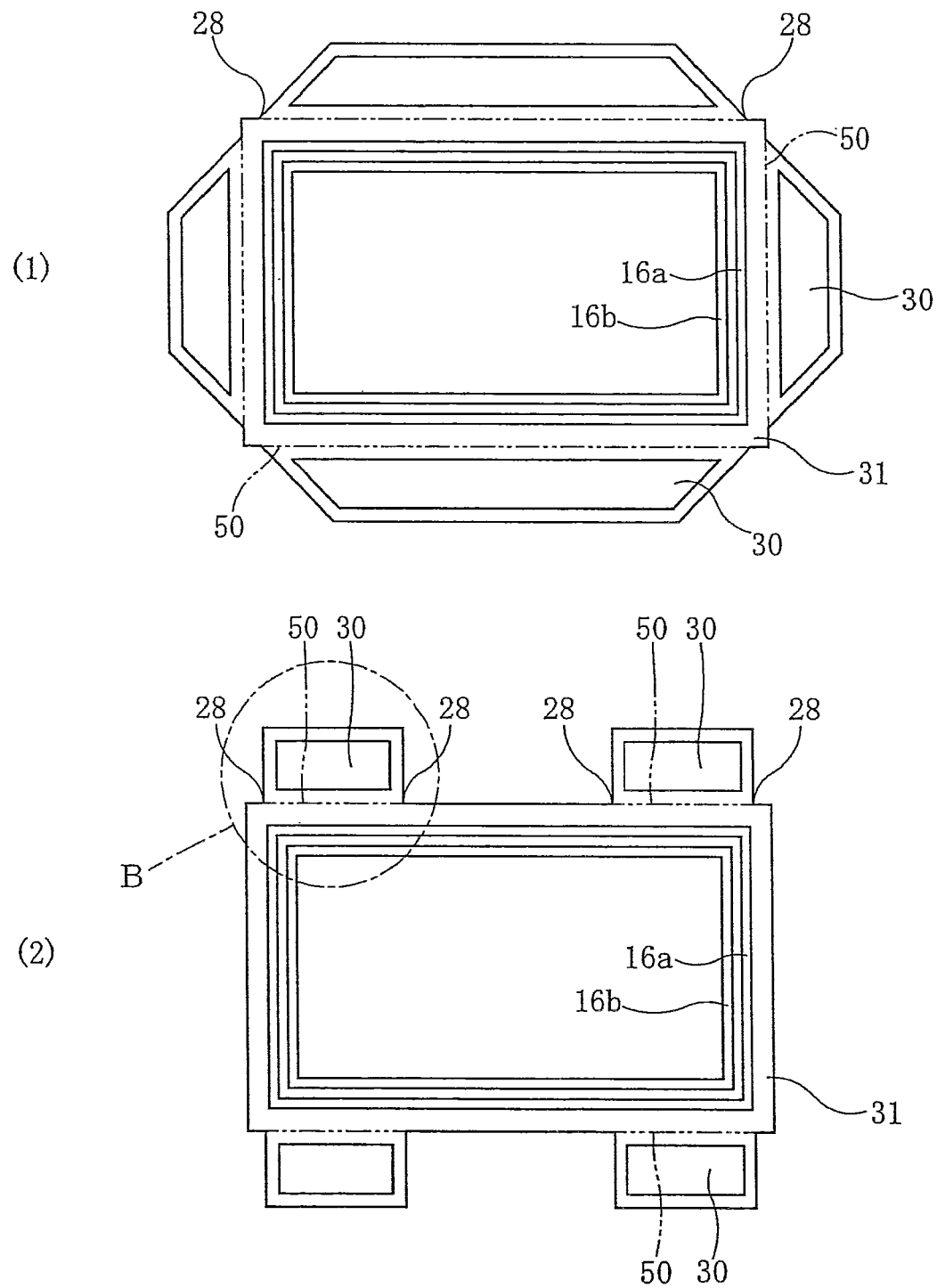
FIG. 2(1) is a bottom view schematically showing a condition of a substrate film before being bent, and FIG. 2(2) is a bottom view of a modification of the substrate film shown in FIG. 2(1)

A mode for putting a pressure-sensitive sensor of the present invention into use will be described hereinafter with reference to the accompanying drawings.

As shown in FIG. 1(1), a pressure-sensitive sensor 40 is incorporated into an electronic device including a cellphone, smart phone, PDA, car navigation system, digital camera, digital video camera, amusement device, etc. Here, the mode will be described in relation to the cellphone 1.

The cellphone 1 comprises a casing 2 made of synthetic resin, a display 3 including a liquid-crystal or organic-EL display section provided in the casing 2, the pressure-sensitive sensor 40 placed on the display 3, and a protective panel 4 placed on the pressure-sensitive sensor 40. The protective panel 4 and the pressure-sensitive sensor 40 are layered and housed in a recess of the casing 2 formed to coincide with a setting position of the display 3 so that a top surface of the casing 2 is flush with a top surface of the protective panel 4.

The protective panel 4 is rectangular as viewed from the top. The top surface of the protective panel 4 includes a transparent display window 8 that allows the display section of the display 3 to be visible from outside and is formed to correspond to the display section, and a decorated portion 9 formed in peripheries of the display window 8 for hiding the inside. The protective panel 4 is selectable between the one that has a so-called touch-input function for detecting an X-Y coordinate of an operational position based on a touching operation relative to the protective panel 4, and the one that does not have such a touch-input function. The touch-input device is selectable between a resistive film type, capacitance type, and electromagnetic induction type.

As shown in FIG. 2(1), the pressure-sensitive sensor 40 includes a substrate film 31 having a rectangular portion as viewed from the top and trapezoidal portions projecting from four sides of the rectangular portion, a pair of electrodes 16a and 16b formed in a loop along peripheries of the rectangular portion of the substrate film 31, and a pressure-sensitive ink layers 30 provided in the trapezoidal portions of the substrate film 31 to juxtapose to the pair of electrodes 16a and 16b. Each of the pressure-sensitive ink layers 30 varies its electrical properties by being pressed. Each trapezoidal portion is bent inward along a crease 50 shown in dashed-two dotted line in FIG. 2(1) so that the pair of electrodes 16a and 16b are brought into contact with the pressure-sensitive ink layers 30.

As shown in FIG. 1(1), the pressure-sensitive sensor 40 is incorporated into the casing 2 with the trapezoidal portions of the substrate film 31 being folded. In this, the pressure-sensitive ink layers 30 and the pair of electrodes 16a and 16b are arranged to contact with each other between a bottom surface of the protective panel 4 and a support portion 2a of the casing 2. Such an arrangement of the pressure-sensitive sensor 40 allows detection of a pressing operation relative to the protective panel 4 (detection of the Z-coordinate), which provides the protective panel 4 with a pressure-sensitive function.

The trapezoidal portions where the pressure-sensitive ink layers 30 are formed project outward from the rectangular portion where the pair of electrodes 16a and 16b are formed, and thus are easily folded inward along the creases representing their root portions. This allows the pressure-sensitive ink layers 30 and the pair of electrodes 16a and 16b to be brought into contact with each other easily.

As shown in FIG. 2(1), the trapezoidal portions of the substrate film 31 where the pressure-sensitive ink layers 30 are formed thereon are configured not to overlap with each other when folded. Such a configuration allows pressure against the protective panel 4 to be applied to the pressure-sensitive layers 30 as the protective panel 4 is pressed, wherever is pressed, thereby making the pressure-sensitive ink layers 30 conductive. As a result, a pressing operation relative to the protective panel 4 can be detected stably and more reliably.

If the protective panel 4 is rigid and not easily bent, a pressing operation can be detected stably and more reliably even when the pressing operational position is not always constant. In such a case, as shown in FIG. 2(2), it is preferable that the pressure-sensitive ink layers 30 are formed to project from the four sides of the rectangular portion of the substrate film 31 where the pair of electrodes 16a and 16b are formed, to have a rectangular shape or trapezoidal shape. This reduces the areas of the pressure-sensitive ink layers 30 and allows pressure to be applied in a concentrated way to boost the pressure sensitivity. In addition, the pressure-sensitive ink layers 30 are easily bent and need less ink. It should be noted that the shape of the projections forming the pressure-sensitive ink layers 30 is not limited to the examples shown in FIGS. 2(1) and 2(2).

Figure 3:
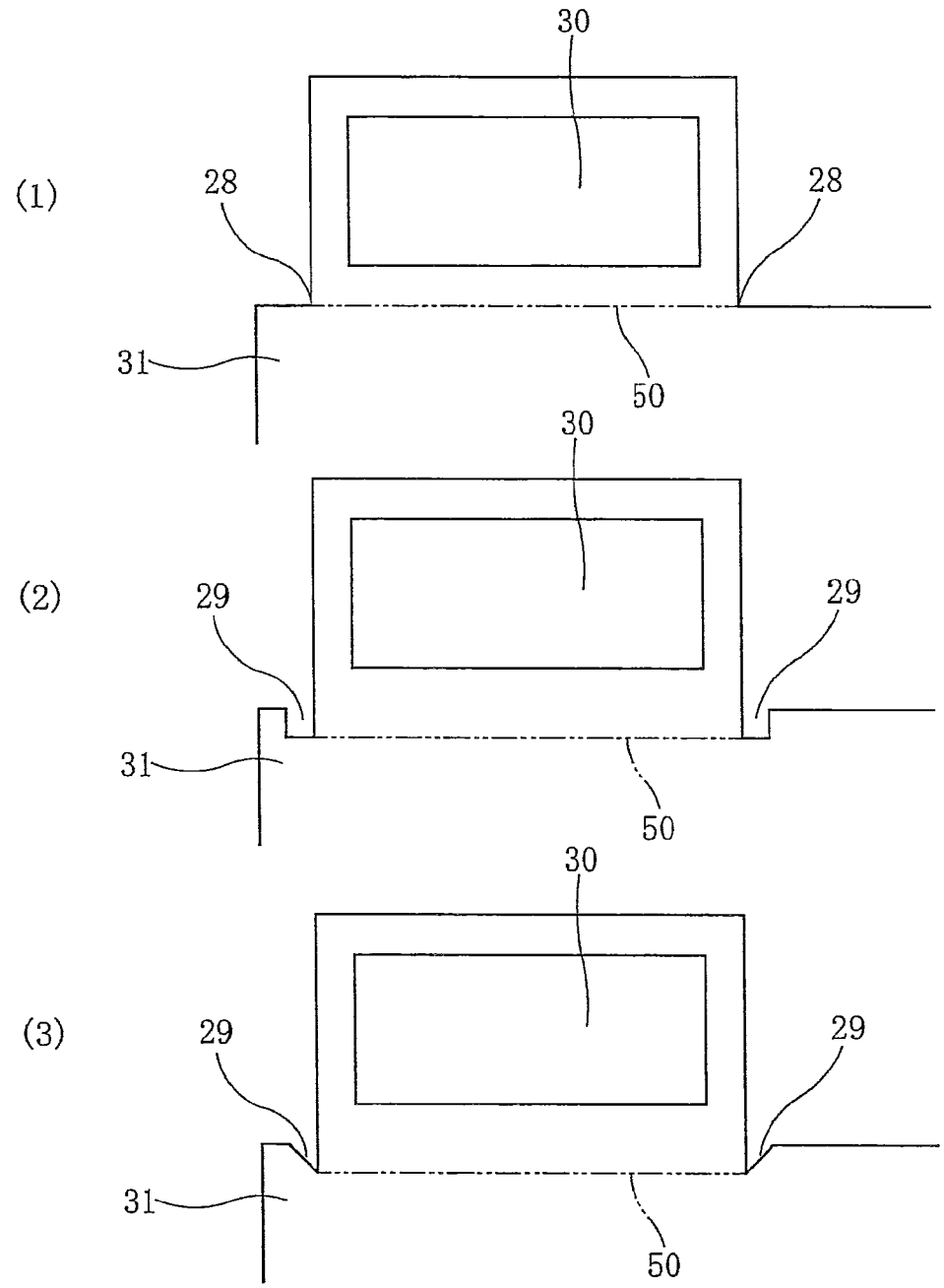
FIG. 3(1) is an enlarged view of a portion B shown in FIG. 2(2), FIG. 3(2) shows a first modification of a root portion shown in FIG. 3(1), and FIG. 3(3) shows a second modification of the root portion shown in FIG. 3(1)

As shown in FIG. 3(1), a half-cutout or bores in the form of broken line may be provided in the root portion 28 of each projection of the substrate film 31 such that the projection is easily bent inward along the crease 50. This allows the bending position to be determined precisely and easily, as a result of which the pressure-sensitive ink layers 30 can be aligned with the electrodes 16a and 16b more accurately. The "half-cutout" means a cut that does not cut the substrate film 31 completely. The bores in the form of broken line mean perforations, for example, and represent a series of cuts where numerous cuts perforating the substrate film 31 and non-perforated portions are arranged alternately. The half-cutout or the bores in the form of broken line may be provided in each projection either before or after the pressure-sensitive ink layer 30 is formed.

The half-cutout may be formed using the Thomson Technique, laser technique or dice-cut technique, for example. When the Thomson Technique is used, a Thomson blade is fixed in a pressing machine first, and then a film is placed in a predetermined position and pressed to form cuts therein. When the laser technique or dice-cut technique is used, a laser or dicing machine scans portions to be cut to form a series of cuts. The Thomson Technique or laser technique is desirable when the bores are formed in broken line. That is, a pressing operation may be performed using a Thomson blade with a sawteeth-like edge. When the laser technique is used, the portions to be cut are scanned by the laser and irradiated intermittently with the laser.

As shown in FIGS. 3(2), and 3(3), cutouts 29 may be provided in the root portion 28 of each projection of the substrate film 31 for preventing the projection to protrude outward when being bent inward. The cutout in this context means a V-shaped or squared U-shaped recess formed in the substrate film 31 by press machining. Examples of the configuration of the cutouts 29 are shown non-limitedly in FIGS. 3(2) and 3(3). The dimension of each cutout may preferably fall in the range from 0.5 mm to several millimeters, which does not affect the appearance of the substrate.

The pressure-sensitive layers 30 are an analog type in which a resistance value varies with a pressing force. A material for the pressure-sensitive layers 30 may be one metal or more, other conducting or semiconducting elements or oxides, or conducting or semiconducting organic or inorganic polymers. More specifically, those materials include one or more of the metals consisting of titanium, tantalum, zirconium, vanadium, niobium, hafnium, aluminum, silicon, tin, chromium, molybdenum, tungsten, lead, manganese, beryllium, iron, cobalt, nickel, platinum, palladium, osmium, iridium, rhenium, technetium, rhodium, ruthenium, gold, silver, cadmium, copper, zinc, germanium, arsenic, antimony, bismuth, boron, scandium, lanthanides and actinoids, and one conducting agent or more, if appropriate. The conducting filler may be used as a basic element in a non-oxidized condition, and may be used in the form of powder, particles or fiber of a conducting material. Preferably, the material is in the form of pellets or spherical particles having a diameter of 0.04 to 0.2 μm. A dispersion ratio may be adjusted appropriately depending on the pressure sensitivity.

The pressure-sensitive layers 30 use, as a binder, a resin having a glass transition point (Tg) falling within a temperature zone that is higher than room temperature. The resin material typically includes vinyl hydrochloride-vinyl acetate copolymer resin, acrylic resin, polyurethane resin, polyester resin, epoxy resin, chlorinated polyolefin, cellulose nitrate resin, ethyl cellulose resin, polyamide resin and light curing resin.

The pressure-sensitive layers 30 may be directly formed in the peripheries of the back surface of the protective panel 4 using a screen printing method, roll coater method or dispenser method, for example. It should be noted that it is more preferable to form the pressure-sensitive layers 30 on the substrate film 31 by using a common printing technique such as the screen printing method, offset printing method, photogravure or flexography and then attach the substrate film 31 having the pressure-sensitive layers 30 formed thereon to the back surface of the protective panel 4, since the printing method suitable for mass production such as roll-to-roll processing (R to R) can be selected. When the substrate film 31 having the pressure-sensitive layers 30 formed thereon covers the entire back surface of the protective panel 4, a cable is assembled to the protective panel 4 after the substrate film 31 is attached to the protective panel 4.

The substrate film 31 having the pressure-sensitive layers 30 formed thereon and attached to the back surface of the protective panel 4 may be engineering plastic that is made of polycarbonates, polyamides or polyether ketones, or a resin film that is made of acrylics, polyethylene terephthalates or polybutylene terephthalates.

Each pressure-sensitive layer 30 has a thickness of 1 to 200 μm. If the thickness is greater than 200 μm, it is not only that a printing layer cannot be formed but also it is not easily applicable to a product that is required to be thin such as a mobile device. On the other hand, if the thickness is less than 1 μm, the pressure detection properties of the pressure-sensitive layers 30 may vary or inconstant.

Figure 4:
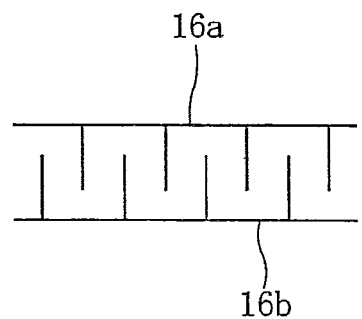
FIG. 4 shows a modification of electrodes.

As shown in FIG. 1(2), a lead 17 such as an FPC that is extended from each of the electrodes 16a and 16b has an end provided with a connector 18 to be connected to a control section 20 mounted inside of the casing 2. More particularly, an input load applied to the protective panel 4 is transmitted to the control section 20 through the lead 17 and connector 18. The control section 20 determines that a pressing operation is executed against the protective panel 4 when the input load applied to the protective panel 4 is or greater than a threshold value. In other words, the control section 20 determines that a pressing operation is executed against the protective panel 4 when the resistance value generated between the pair of electrodes 16a and 16b to be transmitted through the connectors 18 is or lower than the threshold value. FIG. 4 shows comb-teeth electrodes as an example of modification of the pair of electrodes 16a and 16b.

Embodiment 1

Forming Pressure-Sensitive Ink Layers and Electrodes

A pair of comb-teeth electrodes 16a and 16b were formed with silver paste on the substrate film 31 made of a polycarbonate film of 100 μm thick, using the screen printing method. The pressure-sensitive layers 30 were formed in the peripheries of the electrodes with pressure-sensitive ink containing titanium powder in the form of pellets or spherical particles each having a diameter of 0.04 μm to 0.2 μm that is dispersed in the vinyl hydrochloride or vinyl acetate copolymer resin, using the screen printing method.

[Punching the Substrate Film]

As shown in FIG. 2(1), using the Thomson Technique, the substrate film 31 on which the pressure-sensitive ink layers 30 and electrodes 16a and 16b had been formed was punched out so that the trapezoidal portions project from the rectangular portion of the substrate film 31 on which the electrodes 16a and 16b had been formed, with each of the trapezoidal portions having a base defined by each of the four sides of the rectangular portion of the substrate film 31. In carrying out the punching operation, the bores in the form of broken line or perforations arranged along the creases 50 as well as the cutouts 29 as shown in FIGS. 3(2) and 3(3) were also formed at the same time.

[Bending the Substrate Film]

The trapezoidal portions of the punched substrate film 31 on which the pressure-sensitive ink layers 30 had been formed were bent inward along the bores in the form of broken line and layered so that the pressure-sensitive ink layers 30 were brought into contact with the electrodes 16a and 16b and rigidly fixed. The substrate film 31 that had been bent such that the pressure-sensitive ink layers 30 were brought into contact with the electrodes 16a and 16b was attached to the back surface of the protective panel 4.

[Evaluation Result in the Protective Panel]

(1) Evaluation of Pressure Detection

Measurement was made on variations in resistance value of the pressure-sensitive ink layers 30 that were obtained when the surface of the protective panel 4 having the touch-input function provided with the pressure-sensitive ink layers 30 that had been formed as above was pressed with a polyacetal pen having a tip of R0.8. In this measurement, results were obtained that the resistance value of the pressure-sensitive ink layers 30 gradually declined with increase of the pen input load between 0 to 2N (about 200 gf). In this way, it was confirmed that the pen input load was detectable based on the variations of the resistance value.

(2) Evaluation of Durability Under the High-Temperature Environment

The protective panel 4 having the touch-input function provided with the pressure-sensitive ink layers 30 that had been formed as above was left for 16 hours under the high-temperature environment of 85° C., and then operation of pressure detection was observed. As a result, variations in F-R properties were hardly seen before and after the panel was placed under the high-temperature environment.

As demonstrated above, according to the protective panel 4 formed as above, it is considered that, when the surface of the protective panel 4 is pressed, pressure against the protective panel 4 is applied to the pressure-sensitive layers 30 to allow the conductive materials dispersed in the layers to link with one another, which makes the pressure-sensitive layers 30 conductive with the electrodes 16a and 16b. Then, when the protective panel 4 is further pressed intensively, the greater the deformation of the pressure-sensitive layer 30 becomes, the less the resistance value becomes because of increase of the number of the joints where the conductive materials are linked together.

In other words, the protective panel 4 according to the present invention functions as the variable pressure-sensitive sensor 40 for detecting variations in resistance value in response to variations in pressing force applied to the protective panel 4, and thus is capable of detecting a touch-input operational force or writing pressure applied on a pen. When the protective panel 4 is incorporated into an electronic device having a photographing function, it can be used as a zoom switch for changing the zoom speed or a shutter switch for changing the shutter speed in response to the pressing force against the protective panel. When incorporated into an electronic device having a drawing function, it can be used as a writing-pressure detection sensor for changing a shade of color in response to the pressing force against the protective panel 4. In addition, even when the protective panel 4 is used under the high-temperature environment, the pressure-sensitive layers 30 disposed between the protective panel 4 and the supporting portion 2a of the casing 2 do not expand. As a result, the protective panel of the present invention is free from disadvantages that the sensitivity is lowered or connection with the electrodes is poor.

Embodiment 2

As shown in FIG. 2(2), the portions of the substrate film 31 on which the pressure-sensitive layers 30 are formed, each having a rectangular or trapezoidal shape, project from four corners of the portion of the substrate film 13 on which the pair of electrodes 16a and 16b are formed. Otherwise, the structure is the same as in Embodiment 1. The same results were obtained.

INDUSTRIAL APPLICABILITY

The present invention is applicable to a pressure-sensitive sensor for measuring a pressure distribution of a component of external forces applied to a surface that is vertical to the surface.

DESCRIPTION OF REFERENCE NUMERALS 1 cellphone
2 casing
3 display
4 protective panel
8 display window
9 decorated portion
16a, 16b electrodes
17 lead
18 connector
20 control section
28 root portion
29 cutout
30 pressure-sensitive ink layer
31 substrate film
40 pressure-sensitive sensor
50 crease

The invention claimed is:

1. A pressure-sensitive sensor comprising,
a substrate having a rectangular portion and projecting portions which project from peripheries of the rectangular portion in the form of a trapezoid or a rectangle;
a pair of electrodes formed on the rectangular portion along the peripheries of the rectangular portion; and
a pressure-sensitive ink layer formed on the projecting portions, the pressure-sensitive ink layer being variable in electrical properties in response to an applied pressing force,
wherein the projecting portions are bent inward to allow the pressure-sensitive ink layer to come into contact with the pair of electrodes.

2. The pressure-sensitive sensor as claimed in claim 1, wherein each of the projecting portions has a root portion bent inward.

3. The pressure-sensitive sensor as claimed in claim 2, wherein the root portion has a half-cutout or bores in the form of broken line for facilitating inward bending of the root portion.

4. The pressure-sensitive sensor as claimed in claim 2 or 3, wherein the root portion is provided with cutouts at opposite ends thereof for preventing the portion of the substrate having the pressure-sensitive ink layer formed thereon from protruding outward when being bent inward.

5. The pressure-sensitive sensor as claimed in claim 1, wherein the pair of electrodes is formed in a loop along the peripheries of the rectangular portion.

6. The pressure-sensitive sensor as claimed in claim 1, wherein the projecting portions project from each of four sides of the rectangular portion in the form of a trapezoid.

7. The pressure-sensitive sensor as claimed in claim 1, wherein the projecting portions project from each of four corners of the rectangular portion.

* * * * *